United States Patent [19]

Tsujio

[11] 4,349,093
[45] Sep. 14, 1982

[54] CLUTCH FACING

[75] Inventor: Hisami Tsujio, Okazaki, Japan

[73] Assignee: Aisin Seiki Company, Limited, Kariya, Japan

[21] Appl. No.: 4,196

[22] Filed: Jan. 17, 1979

[30] Foreign Application Priority Data

Jan. 20, 1978 [JP] Japan ................... 53-6118[U]

[51] Int. Cl.³ .................. F16D 13/64; F16D 69/04
[52] U.S. Cl. ........................................ 192/107 R
[58] Field of Search ............... 192/107 R, 107 M, 108

[56] References Cited

U.S. PATENT DOCUMENTS

| | | | |
|---|---|---|---|
| 1,927,995 | 9/1933 | Stanley | 192/107 R |
| 2,584,906 | 2/1952 | Narrin | |
| 2,835,367 | 5/1958 | Steck | 192/107 R |
| 2,855,081 | 10/1958 | Morton | |
| 2,904,150 | 9/1959 | Sand | 192/107 R |
| 2,916,123 | 12/1959 | Garmager | 192/107 R |
| 3,920,108 | 11/1975 | Ely | 192/107 R |
| 4,076,106 | 2/1978 | Bermingham et al. | 192/107 R X |

FOREIGN PATENT DOCUMENTS 5249017 of 0000 Japan.

Primary Examiner—Werner H. Schroeder
Assistant Examiner—Andrew M. Falik
Attorney, Agent, or Firm—Oblon, Fisher, Spivak, McClelland & Maier

[57] ABSTRACT

A clutch facing includes an annular reinforcing plate made of metal material, a friction lining bonded on the outer side of the annular reinforcing plate, and another lining bonded on the inner side of the annular reinforcing plate. The annular reinforcing plate is secured to a clutch driven plate assembly by a plurality of rivets. The head portions of the rivets are entirely received in the extruded pocket portions of the annular reinforcing plate, so that the clutch facing will be useful until the friction lining is worn off. Another lining is made of suitable material having a lower comparative cost than the friction lining. An additional lining prevents the annular reinforcing plate from corrosion and prevents the friction lining from experiencing a pressure difference on the friction surface of the friction lining.

6 Claims, 6 Drawing Figures

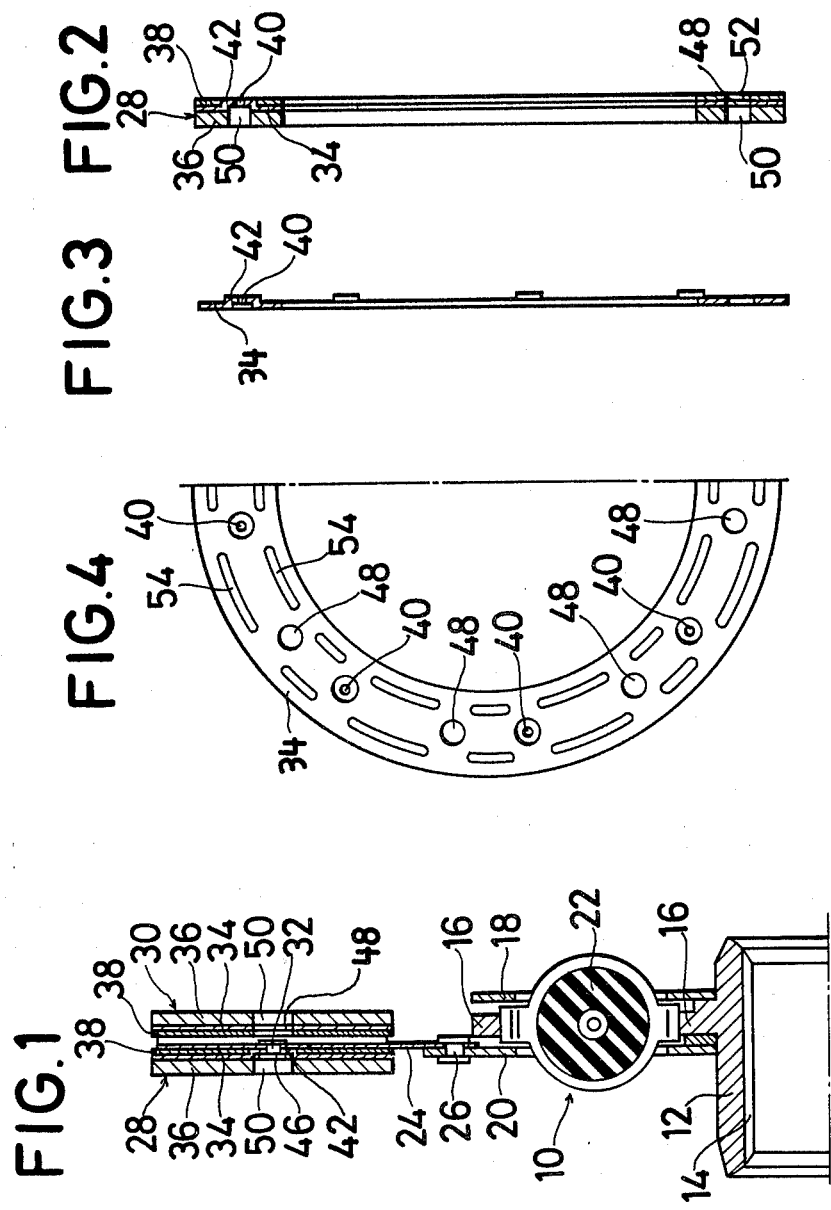

CLUTCH FACING

BACKGROUND OF THE INVENTION

1. Field of the Invention

This invention generally relates to a clutch facing and, more particularly, to a clutch facing for use in a clutch driven plate assembly for motor vehicles.

2. Description of the Prior Art

In order to increase the mechanical strength of a clutch facing, clutch facings have been employed which include a reinforcing plate made of metal material secured to a clutch driven plate assembly by rivets and a friction lining bonded on an outer side of the reinforcing plate by a bonding agent.

In a conventional clutch facing of this type, the head portions of the rivets are positioned in the friction lining so that the clutch facing is not useful when the friction lining is worn off. Such is uneconomical because the friction lining itself is expensive.

SUMMARY OF THE INVENTION

The primary object of this invention is to overcome the aforementioned defects of conventional clutch facings.

Another object of this invention is to provide a new clutch facing which will be useful until the friction lining is worn off.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 1 is a fragmentary sectional view of a clutch driven plate assembly with one embodiment of clutch facings according to the present invention.

FIG. 2 is a sectional view of the embodiment of the clutch facing shown in FIG. 1;

FIG. 3 is a sectional view of an annular reinforcing plate comprised in one embodiment of a clutch facing shown in FIG. 1;

FIG. 4 is a fragmentary frontal view of the annular reinforcing plate shown in the embodiment of the clutch facing of FIG. 3.

DETAILED DESCRIPTION OF THE PREFERRED EMBODIMENTS

Figure 5:
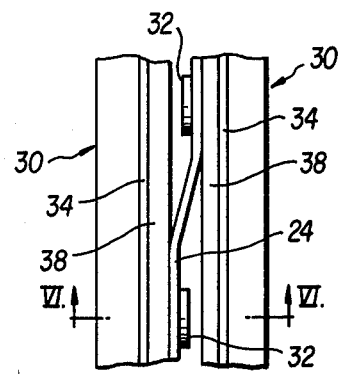
FIG. 5 is a partial detailed side view of the elements between the inner and outer facings shown in FIG. 1

Referring to the drawings, reference numeral 10 designates a clutch driven plate assembly. The clutch driven plate assembly 10 includes a hub 12 having splines 14 provided internally thereof for engagement with a transmission drive shaft (not shown). The hub 12 is provided with a radially extending flange 16.

A washer 18 and a disc plate 20 are rotatably mounted on the hub 12 about the flange 16. The washer 18 and disc plate 20 are axially fixed with respect to each other by means of a plurality of shoulder type rivets (not shown). A plurality of vibration dampers 22 of rubber or other elastic material provide a driving connection between the radially extending flange 16, the washer 18 and disc plate 20. A plurality of deformable waved or curved cushioning springs 24 are disposed around the outer periphery of the disc plate 20 and are secured to the disc plate 20 by means of rivets 26 for normally biasing the reinforcing plates apart. A pair of clutch facings 28 and 30 are further disposed on both sides of the waved cushioning springs 24, respectively, and are secured to the waved cushioning springs 24 by means of rivets 32.

Each of clutch facings 28 and 30 includes an annular reinforcing plate 34 made of steel or other suitable metal material, a friction lining 36 bonded on the outer side of the annular reinforcing plate 34 by a suitable bonding agent, and another lining 38 bonded on the inner side of the annular reinforcing plate 34 by a bonding agent. Each annular reinforcing plate 34 is provided with a plurality of small diameter holes 40 and is secured to the waved cushioning springs 24 by the rivets 32 passed through the small diameter holes 40.

Pocket portions 42 of each annular reinforcing plate 34 surrounding the small diameter holes 40 are extended towards the inner side of each annular reinforcing plate and are U-shaped in cross-section. The pocket portions 42 entirely receive the head portions 46 of the rivets 32, so that the friction linings 36 will be useful until worn off. Each lining 38 is made of suitable material which has an anti-corrosive property, an anti-compressive property, and which has a lower cost than the friction lining 28, such as paper-based material. Each lining 38 is provided with a thickness equal to the height of extruded portions 42 of each annular reinforcing plate 34 so as to prevent the friction linings 36 from experiencing or being subjected to a pressure difference on the friction surface of the friction linings 36 under a clutch engaging condition. The linings 38 prevent the annular reinforcing plate 34 from corrision, so that provision for an anti-corrosive property for each annular reinforcing plate 34 is not necessary. Each annular reinforcing plate 34, each friction lining 36 and each lining 38 are provided with large diameter holes 48, 50 and 52, respectively, for riveting operation of the rivets 32. Moreover, each annular reinforcing plate 34 is provided with a plurality of slots 54 so as to reduce the weight thereof.

Figure 6:
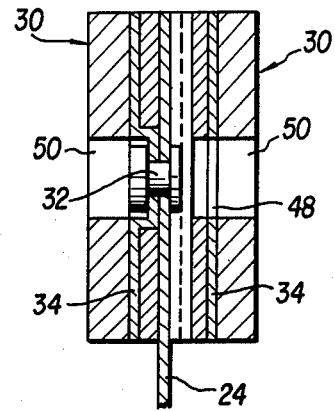
FIG. 6 is a view taken along VI—VI of FIG. 5.

FIG. 5 shows a partial detailed side view of each of the elements between the inner and outer clutch facings shown in FIG. 1. FIG. 6 is a view taken along line VI—VI of FIG. 5.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A clutch facing secured to a clutch driven assembly comprising:
   a first and second annular reinforcing plate;
   a plurality of rivets including head portions for securing each of said annular reinforcing plates to said clutch driven assembly, each of said annular reinforcing plates having a plurality of pocket portions extended towards an inner side thereof, aligned with said rivets and entirely receiving said head portions of said rivets within said pocket portions;
   a deformable spring member position on said inner side of each of said annular reinforcing plates, normally biasing said annular reinforcing plates apart, interconnecting adjacent rivets of said first and second annular reinforcing plates and operatively associated with said clutch drive assembly;

a friction lining bonded on an outer side of each said annular reinforcing plates; and a second lining bonded on said inner side of each of said annular reinforcing plates and wherein said second lining has substantially the same amount of thickness as the height of said pocket portions of each of said reinforcing plates; wherein said head portions of said rivets do not project beyond said outer side of each of said annular reinforcing plates.

2. A clutch facing as set forth in claim 1, wherein each of said annular reinforcing plates comprises steel.

3. A clutch facing as set forth in claim 1 wherein said second lining comprises paper-based material.

4. A clutch facing as set forth in claim 1, wherein each of said annular reinforcing plates includes a plurality of slots so as to reduce the weight thereof.

5. A clutch facing as set forth in claim 1, wherein said rivets engage said second lining.

6. A clutch facing as set forth in claim 1, wherein each of said plurality of pocket portions are U-shaped in cross-section so that said clutch facing is functional until said friction lining is worn off in operation.

* * * * *